(12) United States Patent
Trieb

(10) Patent No.: US 6,935,490 B2
(45) Date of Patent: Aug. 30, 2005

(54) CONVEYING INSTALLATION FOR TRANSPORTING GOODS

(75) Inventor: Herbert Trieb, Wolfurt (AT)

(73) Assignee: Innova Patent GmbH, Wolfurt (AT)

( * ) Notice: Subject to any disclaimer, the term of this patent is extended or adjusted under 35 U.S.C. 154(b) by 0 days.

(21) Appl. No.: 10/755,923

(22) Filed: Jan. 12, 2004

(65) Prior Publication Data

US 2004/0168890 A1 Sep. 2, 2004

(30) Foreign Application Priority Data

Feb. 27, 2003 (AT) .......................................... A 286/2003

(51) Int. Cl.$^7$ .............................................. B65G 39/20
(52) U.S. Cl. ...................... 198/845; 198/818; 198/848; 198/678.1; 198/681; 198/698
(58) Field of Search .................................. 198/817, 818, 198/845, 848, 836.1, 860.1, 678.1, 681, 698, 465.4, 466.1, 837

(56) References Cited

U.S. PATENT DOCUMENTS

| | | | | |
|---|---|---|---|---|
| 3,471,004 A | * | 10/1969 | Ferlemann | 198/827 |
| 3,490,773 A | * | 1/1970 | Dennison | 198/845 |
| 3,793,682 A | * | 2/1974 | Nelson | 198/828 |
| 3,844,404 A | * | 10/1974 | Emmenegger | 198/828 |
| 4,166,528 A | * | 9/1979 | Renner | 198/825 |
| 4,479,574 A | * | 10/1984 | Julius et al. | 198/626.1 |
| 6,588,583 B2 | * | 7/2003 | Trieb | 198/845 |

* cited by examiner

*Primary Examiner*—James R. Bidwell
(74) *Attorney, Agent, or Firm*—Laurence A. Greenberg; Werner H. Stemer; Ralph E. Locher

(57) ABSTRACT

A installation for transporting goods has a conveyor belt with supporting bars carried thereon transversely to the direction of movement of the conveyor belt. Two vertically spaced-apart supporting tracks are formed in each case by two supporting cables. Running rollers that are disposed at the lateral ends of the supporting bars can be moved along the two or more supporting cable pairs. The supporting cables are connected to one another by spaced-apart retaining frames, on which the supporting cables for the running rollers are fastened. At least one further supporting cable, on which the retaining frames are likewise fastened, is provided above the upper pair of supporting cables for the running rollers.

9 Claims, 7 Drawing Sheets

CONVEYING INSTALLATION FOR TRANSPORTING GOODS

BACKGROUND OF THE INVENTION

FIELD OF THE INVENTION

The present invention relates to a conveying system for transporting goods, having a conveyor belt on which there are fastened supporting bars that are oriented transversely to a travel direction of the conveyor belt. Two vertically spaced-apart supporting tracks are formed in each case by two supporting cables. Running rollers at the lateral ends of the supporting bars may be displaced along the supporting cables.

Conveying installations which have two pairs of supporting cables disposed one above the other and a conveyor belt which can be moved along the supporting cables are known in the prior art. The conveyor belt is thereby formed with supporting bars that are oriented transversely to its movement direction and at the free ends of which are mounted running rollers which roll along the supporting cables. In order to improve the wind stability of such conveying installations, it has further been proposed to connect the supporting cables to one another by means of frames. Located within these retaining frames is the continuous conveyor belt, of which the top strand is assigned to the upper pair of the two supporting cables and the bottom strand is assigned to the lower pair of two supporting cables.

Furthermore, it has been proposed to design such a conveying installation, in the region of its two ends, with turning configurations by way of which the loading side of the conveyor belt is turned upward downstream of the unloading station and is turned back once more upstream of the loading station. This prevents the goods which remain on the conveyor belt downstream of the unloading station from being able to fall off the bottom strand of the conveyor belt, for which reason, for environmental protection and for safety purposes, additional measures, such as providing housings or coverings, have to be taken.

Since, in the case of such conveying installations, the conveyable articles are located above the top pair of supporting cables, the latter, although the two pairs of supporting cables are connected to one another by means of retaining frames, only have a low level of stability in relation to wind forces, for which reason, in particular in the case of large spans, there is a risk of the entire conveying installation tipping over, this entailing serious disruption to operation.

SUMMARY OF THE INVENTION

It is accordingly an object of the invention to provide a conveyor installation, which overcomes the above-mentioned disadvantages of the heretofore-known devices and methods of this general type and which provide for considerably improved stability in relation to wind forces.

With the foregoing and other objects in view there is provided, in accordance with the invention, a conveying installation for transporting goods, comprising:

a conveyor belt disposed to move along a travel direction;

a plurality of supporting bars fastened on said conveyor belt transversely to the travel direction;

running rollers supported at lateral ends of said supporting bars;

two vertically spaced-apart supporting tracks each formed with a pair of supporting cables including an upper pair and a lower pair for supporting said running rollers;

spaced-apart retaining frames fastened to said supporting cables; and at least one further supporting cable fastened to said retaining frames above said upper pair of supporting cables.

In other words, the objects are achieved in that the supporting cables are connected to one another by spaced-apart retaining frames, on which the supporting cables for the running rollers are fastened, and in that at least one further supporting cable, on which the retaining frames are likewise fastened, is provided above the top pair of supporting cables for the running rollers.

A further pair of supporting cables is preferably provided above the top pair of supporting cables for the running rollers. Furthermore, the supporting cables located above the top pair of supporting cables for the running rollers are preferably arranged laterally outside the top pair of supporting cables for the running rollers. By virtue of these two measures, the wind stability of such a conveying installation is markedly improved.

According to a further preferred embodiment, the retaining frames are formed with clamps, by means of which the retaining frames are fastened, from beneath in each case, on the supporting cables for the running rollers.

A covering is preferably provided above the top strand of the conveyor belt, this covering being located, in particular, within the retaining frames. Such a covering, on the one hand, protects the conveyable articles and, on the other hand, prevents the conveyable articles from being carried away by wind forces. In addition, it is possible for the lateral regions of the covering located above the corrugated edges of the top strand of the conveyor belt to serve as holding-down means for these corrugated edges.

According to a further embodiment, the retaining frames are continuous. As an alternative to this, it is possible for the retaining frames not to be continuous beneath the bottom pair of supporting cables for the running rollers, and an assembly framework is provided, it being possible for the latter to be fastened on the underside of the conveyor belt and to be moved along therewith.

Other features which are considered as characteristic for the invention are set forth in the appended claims.

Although the invention is illustrated and described herein as embodied in a conveying installation for transporting goods, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
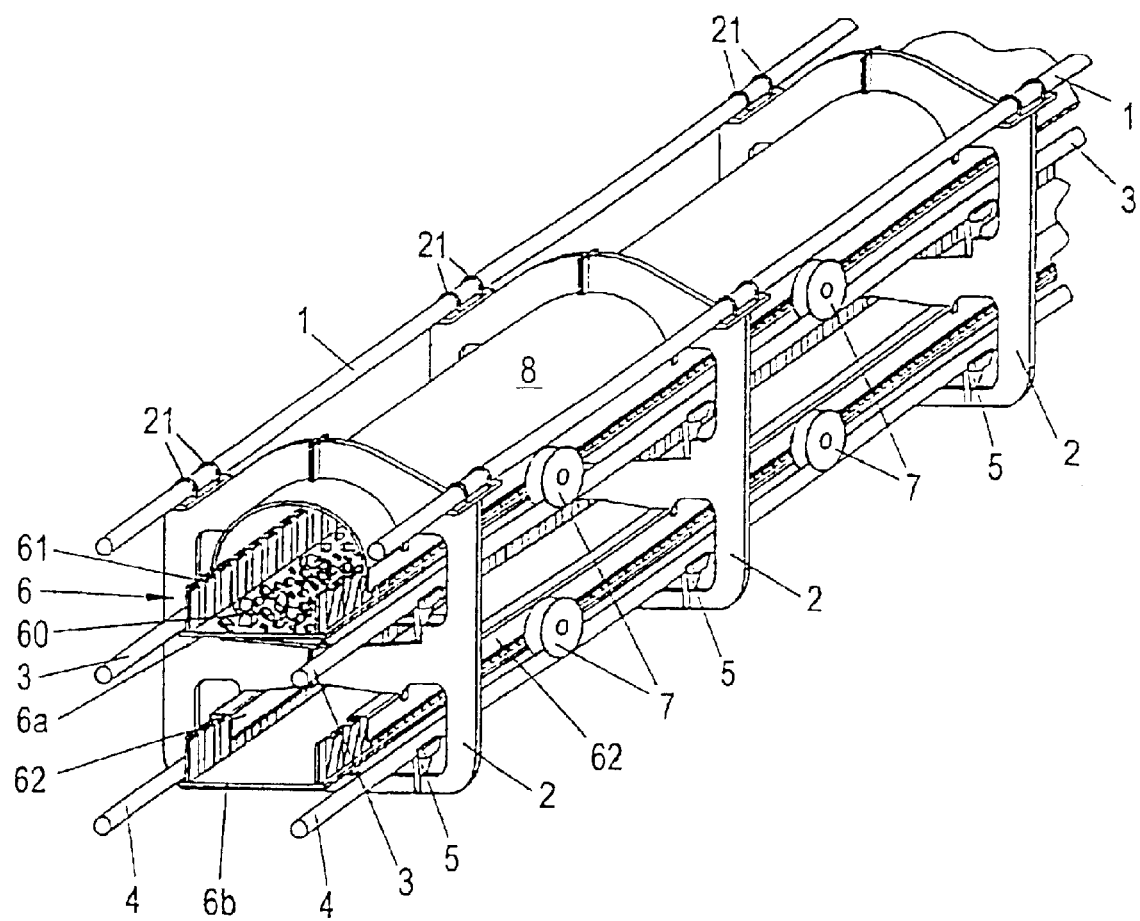
FIG. 1 is a partial schematic axonometric view of a conveying installation according to the invention.
Figure 2:
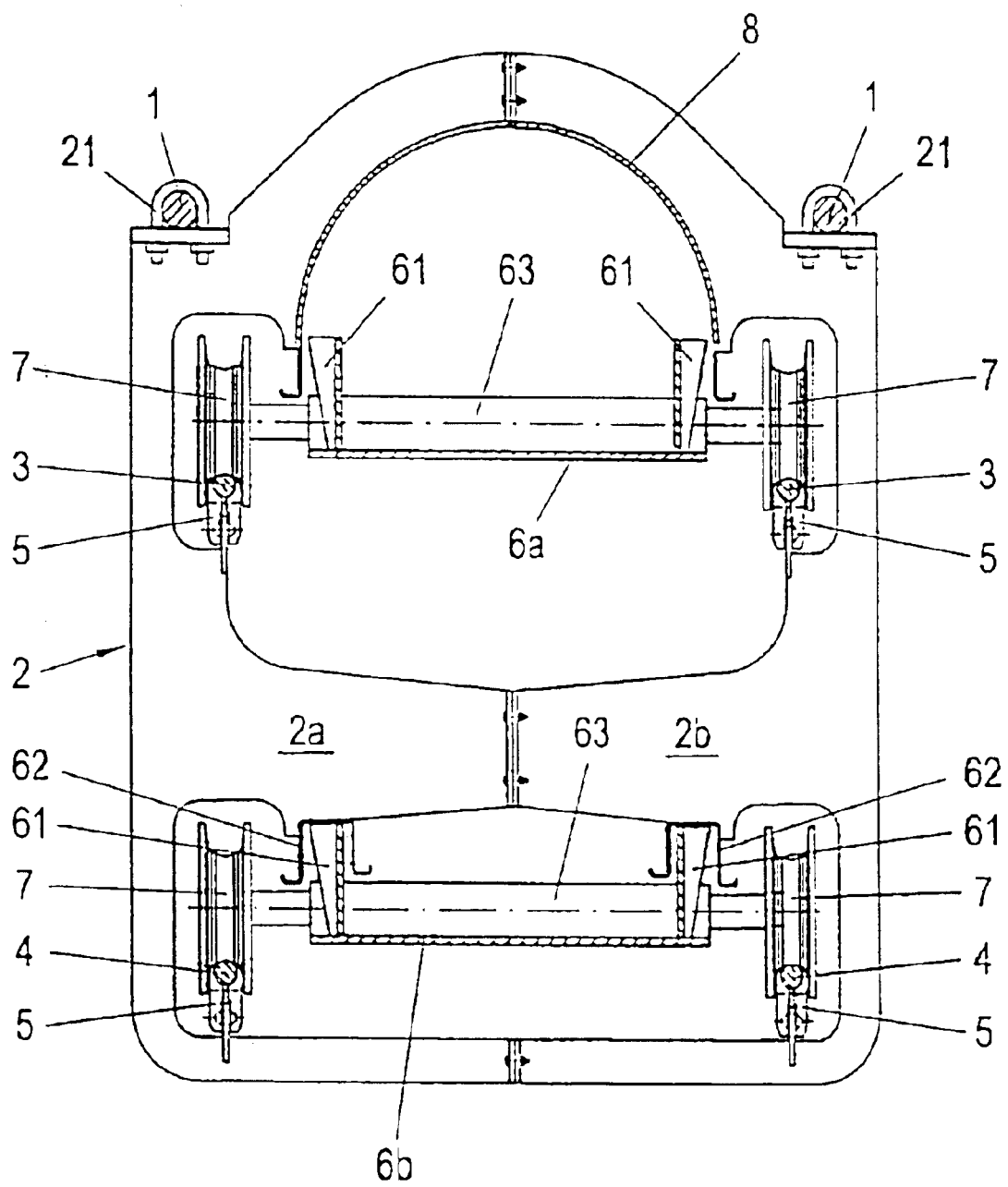
FIG. 2 is an end view of the conveying installation according to FIG. 1.
Figure 2A:
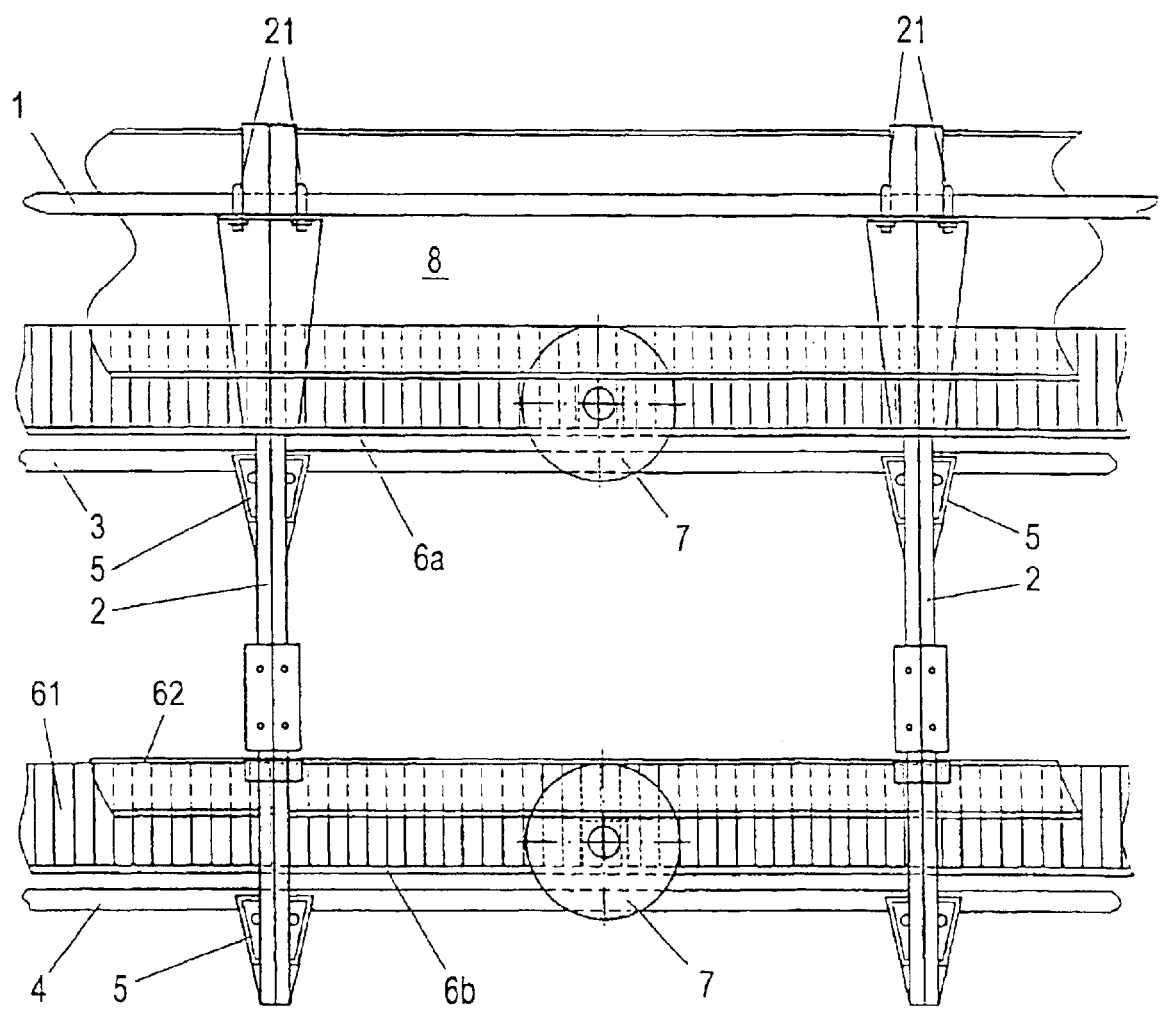
FIG. 2A is a side view thereof.

Referring now to the figures of the drawing in detail and first, particularly, to FIGS. 1, 2, and 2A thereof, there is shown a conveying installation according to the invention with a first pair of supporting cables 1, on which spaced-apart retaining frames 2 are fastened by means of supporting eyelets 21. Located within these retaining frames 2, which are formed by punched sheet-metal parts, are two further pairs of supporting cables 3 and 4, which are connected to the retaining frames 2 by means of clamps 5. The retaining frames 2 are only fastened on the supporting cables 1, 3 and 4. Also located within the retaining frames 2 is a continuous conveyor belt or conveying belt 6, which can be moved along the supporting cables 3 and 4 by means of supporting rollers 7, i.e., in a given travel direction or direction of movement. In this case, the top strand 6a of the conveyor belt 6 can be moved along the top pair of supporting cables 3 by means of the running rollers 7 and the bottom strand 6b of the conveyor belt 6 can be moved along the pair of bottom supporting cables 4. A turning arrangement is assigned to the bottom strand 6b of the conveyor belt 6 downstream of the unloading station, as seen in the conveying direction of the conveyor belt 6, the turning arrangement turning the bottom strand of the conveyor belt 6 such that the loading surface of the latter is directed upward. Provided upstream of the loading station is a further turning arrangement, by means of which the bottom strand 6b is turned back again. This ensures that conveyable articles which remain in the conveyor belt 6 downstream of the unloading station cannot fall off this conveyor belt. The conveyor belt 6 is designed with corrugated edges 61.

Also located within the retaining frames 2 is a cross-sectionally semicircular covering 8, which extends over the entire length of the conveying installation. This covering 8, on the one hand, protects the conveyable articles 60 which are located on the top strand 6a of the conveyor belt 6, and also prevents the conveyable articles from being carried away by the wind. The lateral regions of this covering 8 serve, furthermore, as holding-down means for the corrugated edges 61. The corrugated edges 61 located on the bottom strand 6b are assigned U-shaped rails 62, which likewise serve as holding-down means.

As can be seen from FIG. 2, in addition, the frames 2 each comprise two plates 2a and 2b which are fastened rigidly on one another by flanges. It can also be seen from FIG. 2 that the conveyor belt 6 is designed with bars 63 which are oriented transversely to the movement direction of the conveyor belt and at the free ends of which running rollers 7 are mounted. The corrugated edges 61 are located between the individual bars 63.

Figure 3:
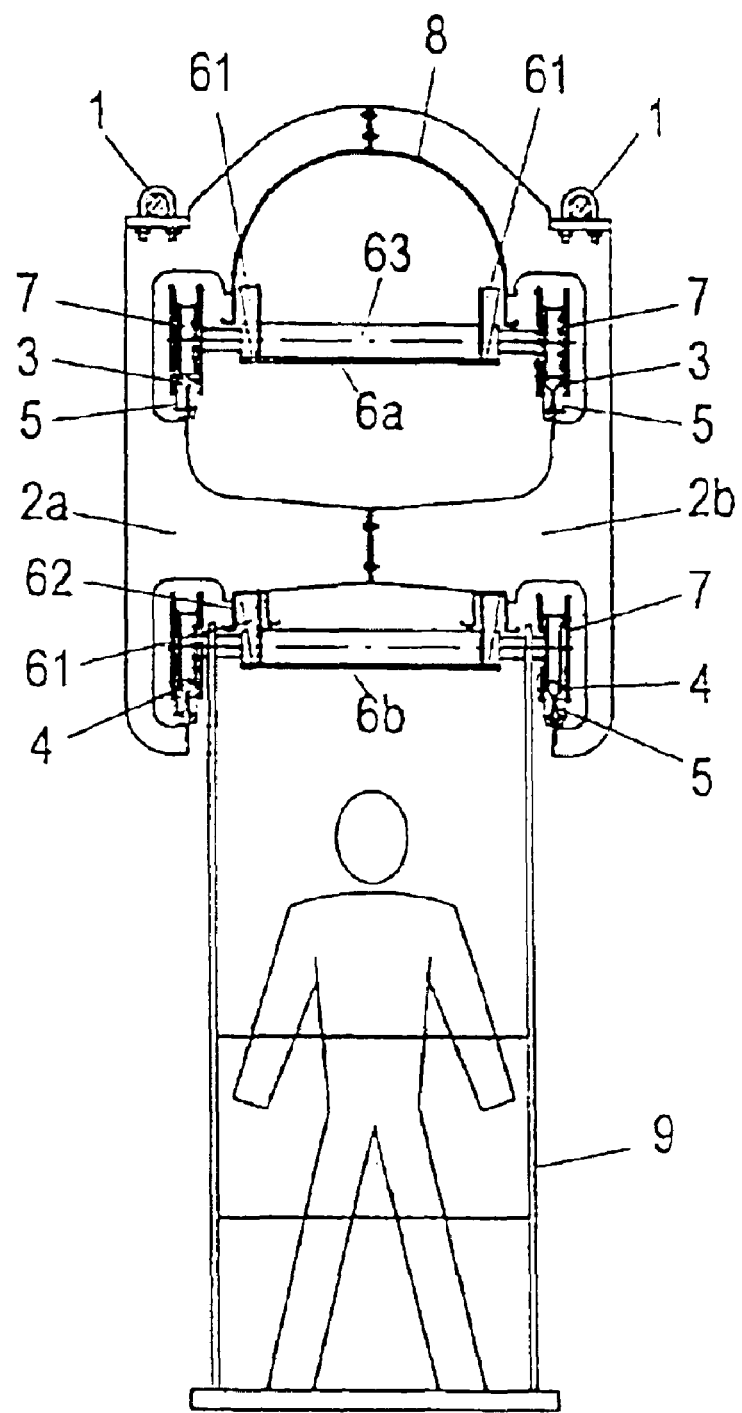
FIG. 3 is an end view of an alternative embodiment of a conveying installation according to the invention.
Figure 3A:
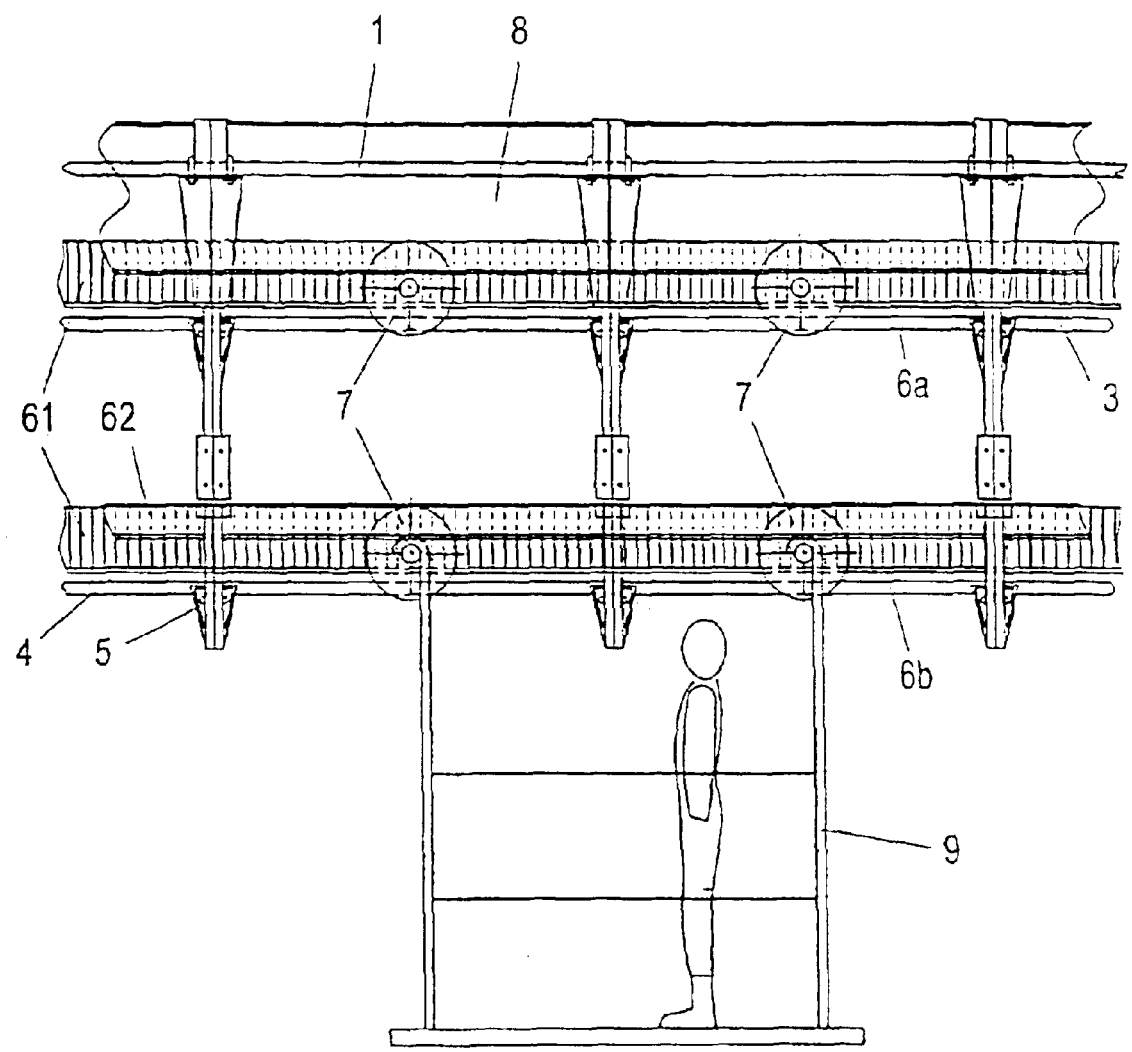
FIG. 3A is a side view thereof.

A variant of a conveying arrangement according to the application is illustrated with reference to FIGS. 3 and 3A. In this case, the retaining frames 2, rather than being closed on their underside, contain a cutout, as a result of which it is possible to fasten a platform 9, serving for assembly purposes, on two successive bars 63.

Figure 4:
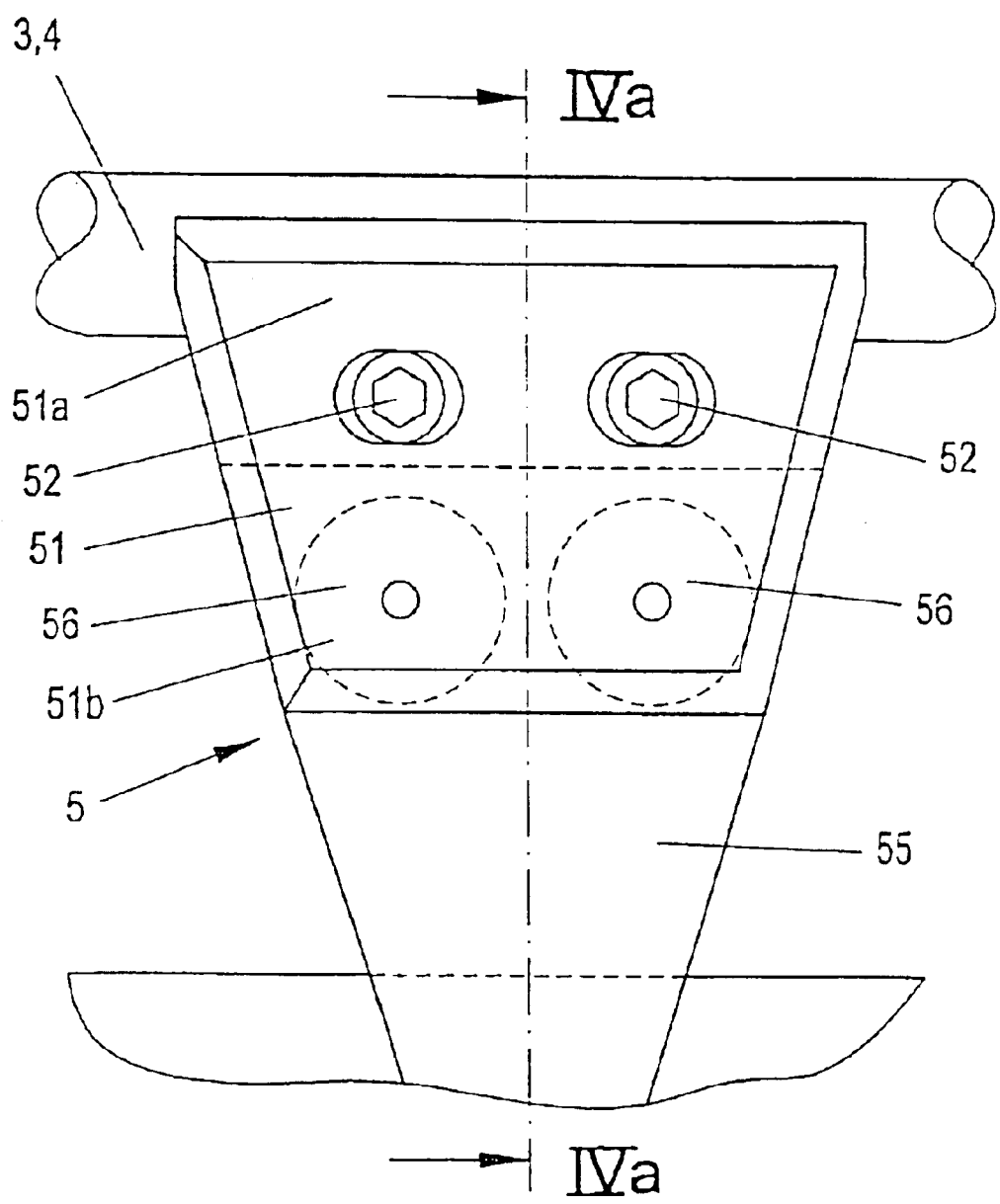
FIG. 4 is a partial side view of a fastening configuration for the assembly according to the invention.
Figure 4A:
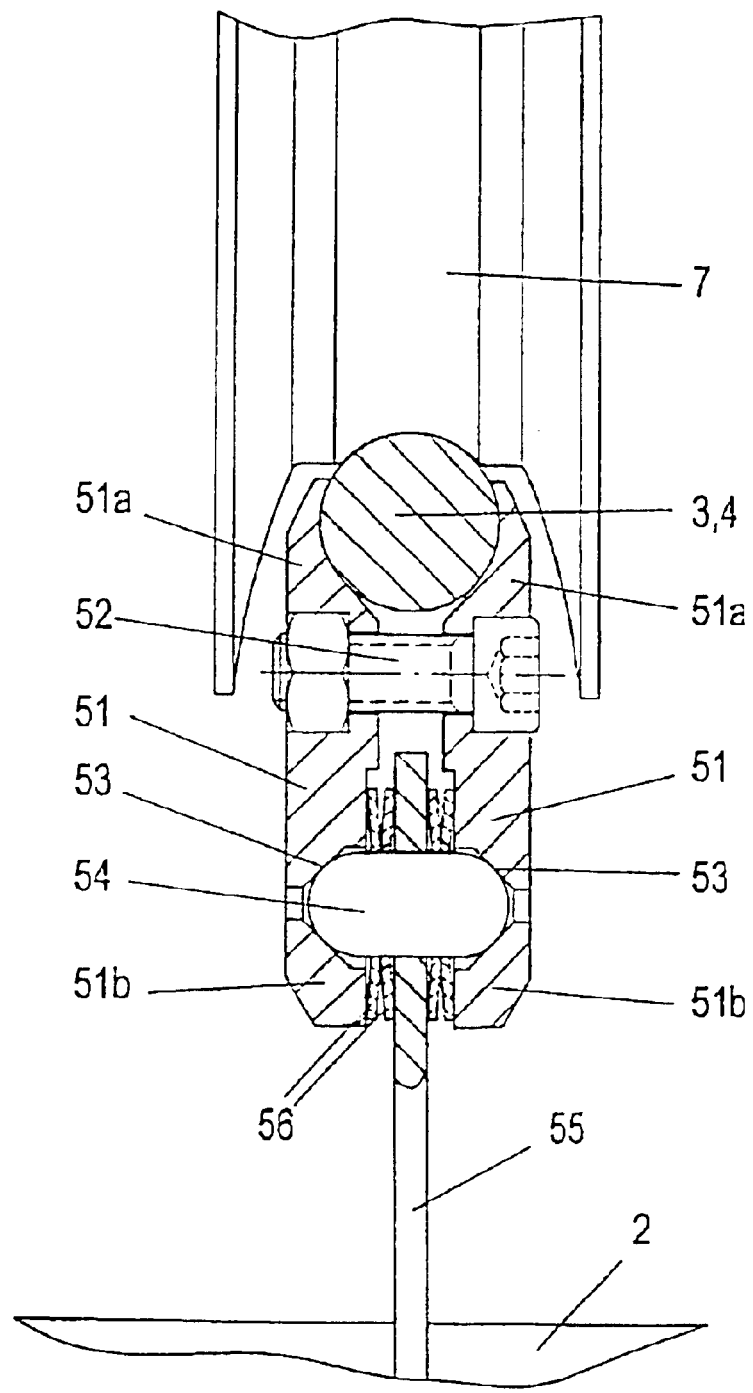
FIG. 4A is a section taken along the line IVa—IVa in FIG. 4.

The design and function of the clamps 5 are explained herein-below with reference to FIGS. 4 and 4A. The clamps 5 comprise two clamping jaws 51, of which the top parts 51a abut against the supporting cables 3, 4. Since, however, the rollers 7 run on the supporting cables 3, 4, the clamping jaws 51 may only butt against the side surfaces of the supporting cables 3, 4. Beneath the top part 51a of the clamping jaws 51, the latter are connected by means of a bolt 52 such that they can be pivoted slightly in relation to one another about an axis running in the direction of the supporting cables 3, 4.

In their bottom region 51b, the clamping jaws 51 contain cutouts 53, which have conical, curved or sloping surfaces on their underside. These cutouts 53 contain supporting bodies 54, which are designed with spherical surfaces and on which supporting brackets 55, connected to the retaining frames 2, are fastened. In addition, cup springs 56 are arranged between the supporting brackets 55 and the clamping jaws 51, the cup spring pressing the top parts 51a of the clamping jaws 51 onto the supporting cables 3, 4. These cup springs 56 allow for changes in the diameter of the supporting cables 3 and 4.

As soon as the supporting bodies 54 are subjected to a tensile force by the retaining frame 2, via the supporting brackets 55, the bottom regions 51b of the clamping jaws 51 are spread apart from one another, as a result of which the clamping forces to which the supporting cables 3, 4 are subjected by the top jaw parts 51a are increased. This ensures that, in the case of the clamps 5 being subjected to greater loading by the retaining frames 2, the clamps 5 are prevented from being released from the supporting cables 3, 4.

Since the center of gravity of such an installation is located beneath the at least one further supporting cable provided above the supporting cables for the running rollers, this conveying installation has a very high level of positional stability, as a result of which there is no risk of it tipping over even in the case of high wind strength. In addition, on the one hand, the conveyable articles are protected by the continuous covering and, on the other hand, conveyable articles are prevented from being carried away by wind forces.

I claim:

1. A conveying installation for transporting goods, comprising:
    a conveyor belt disposed to move along a travel direction;
    a plurality of supporting bars fastened on said conveyor belt transversely to the travel direction;
    running rollers supported at lateral ends of said supporting bars;
    two vertically spaced-apart supporting tracks each formed with a pair of supporting cables including an upper pair and a lower pair for supporting said running rollers;
    spaced-apart retaining frames fastened to said supporting cables; and
    at least one further supporting cable fastened to said retaining frames above said upper pair of supporting cables.

2. The conveying installation according to claim 1, wherein said at least one further supporting cable is one of a further pair of supporting cables above said upper pair of supporting cables for said running rollers.

3. The conveying installation according to claim 2, wherein said cables of said further pair of supporting cables are disposed laterally outside said supporting cables of said upper pair of supporting cables for said running rollers.

4. The conveying installation according to claim 1, wherein said retaining frames are formed with clamps configured to fasten said retaining frames, from underneath in each case, on said supporting cables for said running rollers.

5. The conveying installation according to claim 1, which further comprises a covering above a top strand of said conveyor belt.

6. The conveying installation according to claim 5, wherein said covering is disposed within said retaining frames.

7. The conveying installation according to claim 6, wherein said conveyor belt is formed with corrugated edges, and said covering has lateral regions disposed above said corrugated edges of the top strand of said conveyor belt serving as holding-down means for said corrugated edges.

8. The conveying installation according to claim 1, wherein said retaining frames are connected beneath said lower pair of said supporting cables for said running rollers.

9. The conveying installation according to claim 1, wherein said retaining frames are not connected beneath said lower pair of said supporting cables for said running rollers, and which further comprises an assembly framework configured to be fastened to an underside of said conveyor belt and to be moved along with said conveyor belt.

* * * * *